(12) United States Patent
Nagasaka et al.

(10) Patent No.: US 6,924,734 B2
(45) Date of Patent: Aug. 2, 2005

(54) VEHICULAR REMOTE CONTROL APPARATUS AND ENGINE OPERATION WARNING METHOD

(75) Inventors: Chikao Nagasaka, Aichi (JP); Toru Nakamura, Aichi (JP); Toshiyuki Isogai, Aichi (JP); Shinji Kishida, Toyota (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 77 days.

(21) Appl. No.: 10/420,283

(22) Filed: Apr. 22, 2003

(65) Prior Publication Data

US 2003/0224818 A1 Dec. 4, 2003

(30) Foreign Application Priority Data

Apr. 24, 2002 (JP) ....................................... 2002-122156

(51) Int. Cl.[7] .............................................. B60R 25/10
(52) U.S. Cl. .............................. 340/426.15; 340/425.5; 340/438; 180/268
(58) Field of Search ....................... 340/426.12, 426.18, 340/502, 500, 425.5, 426.28, 438, 426.15, 426.3, 426.13; 180/268; 307/10.2

(56) References Cited

U.S. PATENT DOCUMENTS 4,940,964 A * 7/1990 Dao ............................ 340/438
5,559,491 A * 9/1996 Stadler .................... 340/426.25
5,739,747 A * 4/1998 Flick ....................... 340/426.15
5,973,592 A * 10/1999 Flick ....................... 340/426.15
6,525,645 B2 * 2/2003 King et al. .................... 340/5.7

FOREIGN PATENT DOCUMENTS

JP    2000-326827    11/2000

* cited by examiner

Primary Examiner—Phung T. Nguyen
(74) Attorney, Agent, or Firm—Crompton, Seager & Tufte, LLC

(57) ABSTRACT

A vehicular remote control apparatus warns a driver when the driver moves from the inside of a vehicle to the outside of the vehicle while an engine is operating. The vehicular remote control apparatus is located inside the vehicle and includes a transmitter-receiver for generating a first request signal and a portable device for generating a transmission signal in response to the first request signal and transmitting the transmission signal to the transmitter-receiver. The first request signal is transmitted to outside the vehicle. The transmitter-receiver includes a determining device for determining whether the engine is operating and a warning signal transmission device for generating a first warning signal if the engine is operating when receiving the transmission signal and transmitting the first warning signal to the portable device located outside the vehicle. The portable device includes a warning device for giving a warning when the portable device receives the first warning signal.

23 Claims, 3 Drawing Sheets

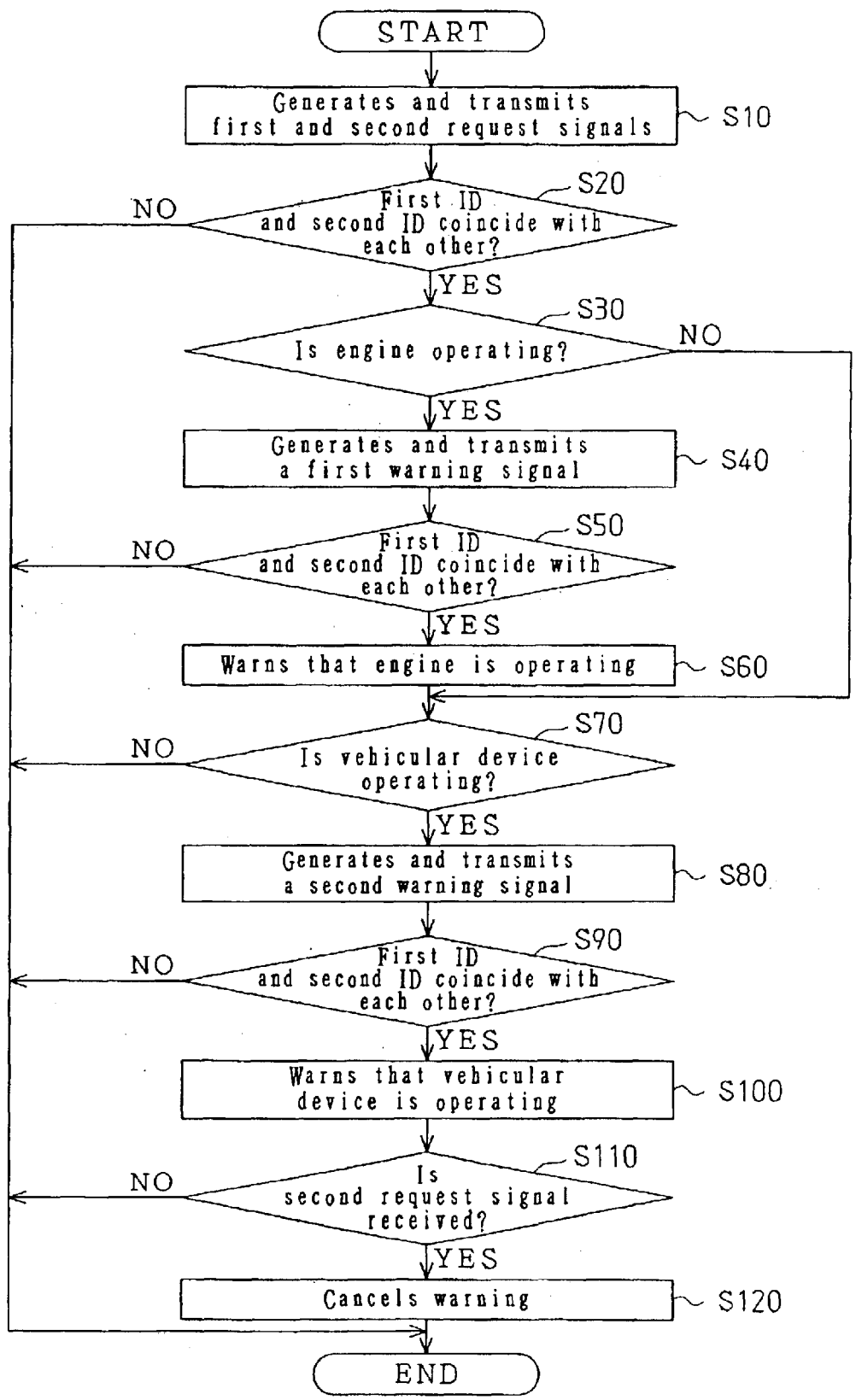

VEHICULAR REMOTE CONTROL APPARATUS AND ENGINE OPERATION WARNING METHOD

BACKGROUND OF THE INVENTION

The present invention relates to a vehicular remote control apparatus and an engine operation warning method, and more specifically, to a method for warning a driver that an engine is left in an operating state using the vehicular remote control apparatus.

In automobiles, the improvement of operability is desired, as well as the improvement of basic performance and safety. For example, a vehicular remote control apparatus that operates devices installed in a vehicle by a remote control is the case in point.

To give an actual example, a vehicular remote control apparatus has been proposed that functions as a door automatic locking and unlocking apparatus and as an engine automatic standby apparatus. The door automatic locking and unlocking apparatus automatically unlocks a door when an owner, or a driver, of a vehicle approaches the vehicle, and automatically locks the door when the driver walks away from the vehicle. The engine automatic standby apparatus starts the engine and turns the engine into a standby state by manipulation of a switch and not by use of a mechanical key.

A conventional vehicular remote control apparatus generally includes a portable device held by a driver and a transmitter-receiver mounted inside the vehicle. Two antennas are located on the outside and inside of the vehicle passenger compartment for transmitting a request signal to the portable device. The outside antenna transmits a first request signal to a predetermined area, or a first area, about the vehicle passenger compartment, and the inside antenna sends a second request signal to a predetermined area, or a second area, inside the vehicle passenger compartment.

When the portable device receives a request signal, the portable device generates a transmission signal in response to the request signal and transmits the transmission signal to the transmitter-receiver. When the transmission signal is transmitted in response to the first request signal, the vehicular remote control apparatus functions as the door automatic locking and unlocking apparatus. When the transmission signal is transmitted in response to the second request signal, the vehicular remote control apparatus functions as the engine automatic standby apparatus. That is, the vehicular remote control apparatus generates two types of request signals using two antennas to determine the position of the portable device and varies its function in accordance with the position of the portable device.

When getting off the vehicle, the driver manipulates the switch of the portable device to stop the engine and gets off the vehicle holding the portable device. When the driver closes the door and walks away from the vehicle, the door is automatically locked.

However, when the driver gets off the vehicle holding the conventional portable device and walks away from the vehicle, the driver might forget to manipulate the switch to stop the engine. In this case, the engine is left in an operating state.

SUMMARY OF THE INVENTION

One aspect of the present invention is a remote control apparatus of a vehicle having an engine. The remote control apparatus includes a transmitter-receiver and a portable device. The transmitter-receiver is located inside the vehicle and generates a first request signal, which includes a first ID code. The portable device generates a transmission signal in response to the first request signal and transmits the transmission signal to the transmitter-receiver. The first request signal is transmitted to outside the vehicle. The transmitter-receiver includes a determining device and a warning signal transmission device. The determining device determines whether the engine is operating. When it is determined, by the determining device, that the engine is operating when receiving the transmission signal, the warning signal transmission device generates a first warning signal and transmits the first warning signal to outside the vehicle. The portable device includes a warning device. When the portable device receives the first warning signal, the warning device gives a warning.

A further aspect of the present invention is a remote control apparatus of a vehicle having an engine. The remote control apparatus includes a transmitter-receiver and a portable device. The transmitter-receiver is located inside the vehicle and generates a request signal, which includes a first ID code. The portable device generates a transmission signal, which includes a second ID code corresponding to the first ID code, in response to the request signal and transmits the transmission signal to the transmitter-receiver. The request signal is transmitted to outside the vehicle when the vehicle is stopped. The transmitter-receiver includes a first control device and a transmission circuit. The first control device determines whether the engine is operating and receives the transmission signal. The first control device determines whether the first ID code coincides with the second ID code. When it is determined that the engine is operating and the first ID code coincides with the second ID code, the first control device generates a first warning signal. The transmission circuit is connected to the first control device. The transmission circuit transmits the first warning signal with the first ID code to outside the vehicle. The portable device includes a second control device and a warning device. The second control device receives the first warning signal and determines whether the first ID code coincides with the second ID code. When the first ID code coincides with the second ID code, the second control device generates a first warning control signal. The warning device is connected to the second control device. The warning device gives a warning indicating that the engine is operating in accordance with the first warning control signal.

A further aspect of the present invention is a method relating to a vehicle having an engine for giving a warning by means of a transmitter-receiver located inside the vehicle and a portable device that communicates with the transmitter-receiver. The method includes generating a first request signal including a first ID code and transmitting the first request signal to outside the vehicle by means of the transmitter-receiver when the vehicle is stopped, generating a transmission signal, which includes a second ID code corresponding to the first ID code, in response to the first request signal and transmitting the transmission signal to the transmitter-receiver, generating a first warning signal if the engine is operating when the transmitter-receiver receives the transmission signal, transmitting the first warning signal to outside the vehicle, and giving a first warning by means of the portable device in accordance with the first warning signal when the portable device receives the first warning signal. The first warning indicates that the engine is operating.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 3 is a schematic flowchart showing a warning process of the vehicular remote control apparatus according to the first embodiment.

DETAILED DESCRIPTION OF THE PREFERRED EMBODIMENTS

Figure 1:
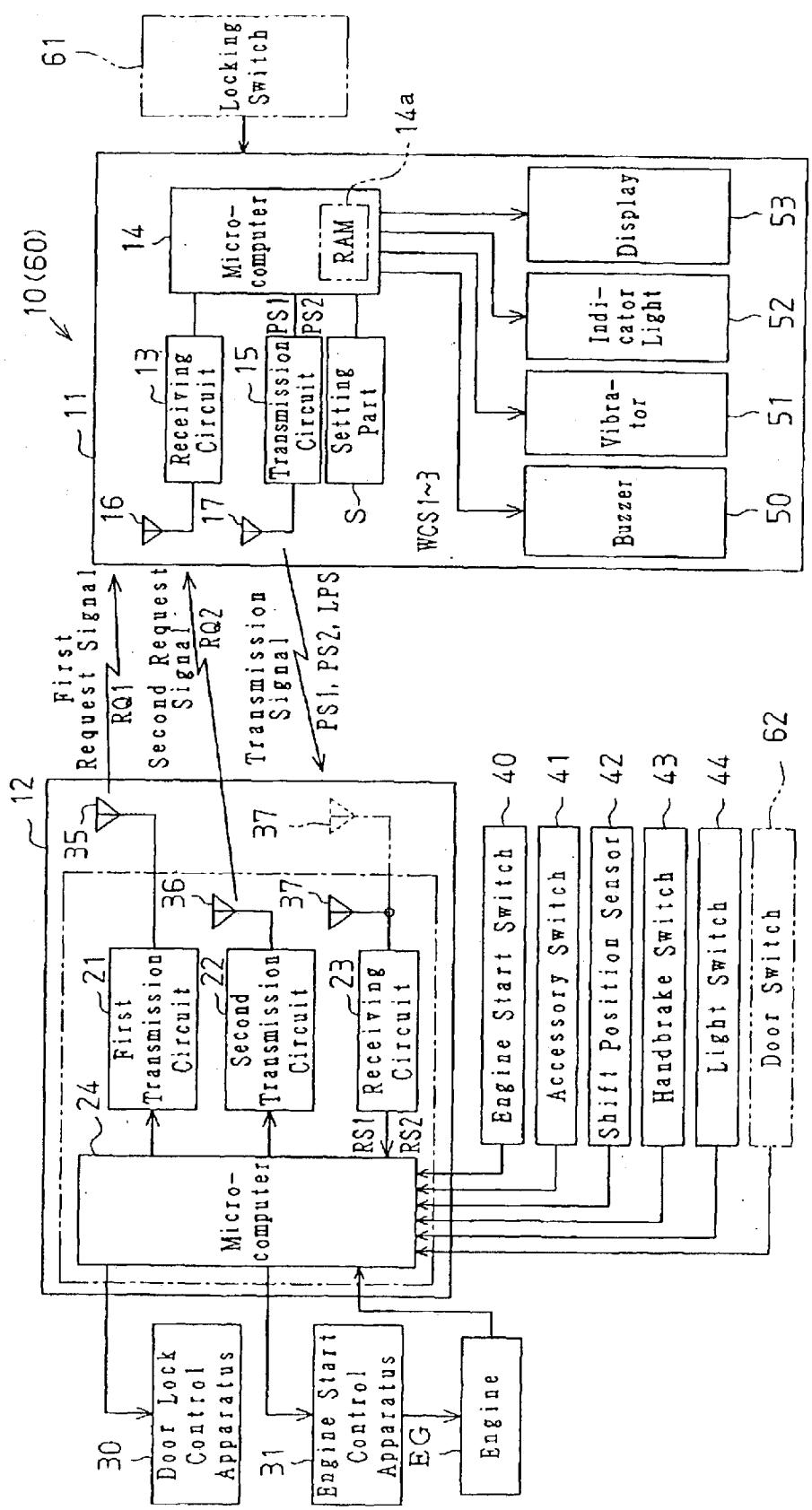
FIG. 1 is a schematic block diagram illustrating a remote control apparatus according to first and second embodiments of the present invention.

In the drawings, like numerals are used for like elements throughout.

FIG. 1 is a schematic block diagram illustrating a remote control apparatus 10 according to a first embodiment of the present invention. As shown in FIG. 1, the vehicular remote control apparatus 10 includes a portable device 11, which is held by an owner, or a driver, of a vehicle V, and a transmitter-receiver for remote control, which is mounted on the vehicle V (hereinafter, simply referred to as a transmitter-receiver 12).

The portable device 11 includes a receiving circuit 13, a warning control device, which is a first microcomputer (second control device) 14 in this embodiment, and a transmission circuit 15. The receiving circuit 13 is connected to the first microcomputer 14. When receiving first and second request signals RQ1, RQ2 from a transmitter-receiver 12, the receiving circuit 13 generates pulse signals by demodulating the first and second request signals RQ1, RQ2. The pulse signals are supplied to the first microcomputer 14. The first and second request signals RQ1, RQ2 include base ID code (hereinafter, referred to a first ID code).

The transmission circuit 15 is connected to the first microcomputer 14 and modulates electric wave of a predetermined frequency (for example, 300 MHz) by a transmission signal PS supplied from the first microcomputer 14. The receiving circuit 13 and the transmission circuit 15 are connected to antennas 16, 17, respectively. The receiving circuit 13 receives first and second request signals RQ1, RQ2 via the antenna 16 and the transmission circuit 15 sends an electric wave that includes the transmission signal PS via the antenna 17.

The first microcomputer 14 is a CPU unit, which includes a CPU, a ROM, and a RAM, which are not shown. The first microcomputer 14 has, for example, a handset ID code (hereinafter, referred to as a second ID code), which is stored in the ROM. When receiving the first and second request signals RQ1, RQ2 from the receiving circuit 13, the first microcomputer 14 compares the first ID code with the second ID code. If the first ID code coincides with the second ID code, the first microcomputer 14 generates a transmission signal PS that includes the second ID code and sends the transmission signal PS to the transmission circuit 15. The first and second ID codes are specific ID codes set for each vehicle V and are actually the same.

The transmitter-receiver 12 includes a first transmission circuit 21, a second transmission circuit 22, a receiving circuit 23, and a second microcomputer (first control device) 24. The transmitter-receiver 12 is located at the lower part of a driver's seat in the vehicle passenger compartment. The second microcomputer 24 corresponds to a determining device and a warning signal transmission device.

The second microcomputer 24 is connected to a door lock control apparatus 30 and an engine start control apparatus 31. The door lock control apparatus 30 selectively locks and unlocks a door lock K in accordance with a door lock control signal supplied from the second microcomputer 24. The engine start control apparatus 31 is connected to a starter and an igniter (not shown). The engine start control apparatus 31 starts an engine EG via the starter in accordance with a start control signal supplied from the second microcomputer 24. The engine start control apparatus 31 controls electric power supplied to the igniter after starting the engine EG.

The first and second transmission circuits 21, 22 and the receiving circuit 23 are connected to antennas 35, 36, and 37, respectively. The first transmission circuit 21 incorporates a first request signal RQ1, which includes the first ID code, supplied from the second microcomputer 24 in an electric wave and transmits the electric wave to a first area A1 (see FIG. 2) outside the vehicle V via the antenna 35.

The second transmission circuit 22 incorporates the second request signal RQ2, which includes the first ID code, in an electric wave of a predetermined frequency (for example, 134 kHz). The electric wave is transmitted to a second area A2 (see FIG. 2) inside of the vehicle V via the antenna 36. Therefore, the portable device 11 and the transmitter-receiver 12 communicate with each other in the first and second area A1, A2.

The receiving circuit 23 receives an electric wave that includes the transmission signal PS sent from the portable device 11 via the antenna 37, and demodulates the electric wave to generate a pulse signal, which is a receiving signal RS. The receiving signal RS is then supplied to the second microcomputer 24. More specifically, when receiving a first transmission signal PS1 corresponding to the first request signal RQ1, the receiving circuit 23 generates a first receiving signal RS1, and when receiving a second transmission signal PS2 corresponding to the second request signal RQ2, the receiving circuit 23 generates a second receiving signal RS2.

The second microcomputer 24 is connected to an engine start switch 40. When an engine start button (not shown) located inside the vehicle V is pressed, the engine start switch 40 generates an engine start signal and supplies the engine start signal to the second microcomputer 24.

The second microcomputer 24 is a CPU unit, which includes a CPU, ROM, and a RAM, which are not shown, and has, for example, a first ID code, which is stored in the ROMN The second microcomputer 24 generates the first request signal RQ1, which includes the first ID code, and the second request signal RQ2, which includes the first ID code. The first request signal RQ1 is supplied to the first transmission circuit 21 and the second request signal RQ2 is supplied to the second transmission circuit 22.

The second microcomputer 24, for example, generates the first request signal RQ1 and the second request signal RQ2 alternately per predetermined time when the vehicle is stopped. The first and second request signals RQ1, RQ2 are then supplied to the first and second transmission circuits 21, 22, respectively. When receiving the receiving signal RS, the second microcomputer 24 compares the first ID code with the second ID code included in the receiving signal RS (transmission signal PS).

If, when the door lock K is locked, the second ID code is included in the first transmission signal PS1 and the second ID code coincides with the first ID code, the second microcomputer 24 generates an unlock signal and supplies the unlock signal to the door lock control apparatus 30. The door lock control apparatus 30 unlocks the door lock K in accordance with the unlock signal.

If the second ID code is included in the second transmission signal PS2 and the second ID code coincides with the first ID code, the second microcomputer 24 stands ready to start the engine EG (engine start standby state). When receiving an engine start signal from the engine start switch 40 while in the engine start standby state, the second microcomputer 24 generates a start control signal. The start control signal is supplied to the engine start control apparatus 31. The engine start control apparatus 31 starts the engine EG in accordance with the start control signal.

In the case where the door lock K is unlocked and the receiving circuit 23 does not receive the first and second transmission signals PS1, PS2, although the first and second request signals RQ1, RQ2 are respectively transmitted from the first and second transmission circuits 21, 22, the second microcomputer 24 locks the door lock K.

That is, the vehicular remote control apparatus 10 functions as the door automatic locking and unlocking apparatus when the portable device 11 is located outside the vehicle V and functions as the engine automatic standby apparatus when the portable device 11 is located inside the vehicle V.

The characteristics of the vehicular remote control apparatus 10 according to the first embodiment will now be described.

The engine EG has, for example, a rotational speed sensor (not shown), which detects the rotational speed of the engine EG and generates a rotational speed signal. The rotational speed signal is supplied to the second microcomputer 24 as an engine operation signal.

The second microcomputer 24 is connected to an accessory switch 41, a shift position sensor 42, a handbrake switch 43, and a light switch 44.

The accessory switch 41 generates an accessory signal when an accessory device M1 of the vehicle V is turned on, and supplies the accessory signal to the second microcomputer 24. The accessory switch 41 is, for example, a power source switch of a car audio, which includes a car radio. The shift position sensor 42 generates a shift position signal when a shift apparatus M2 of the vehicle V is at shift positions other than a parking position, and supplies the shift position signal to the second microcomputer 24.

The handbrake switch 43 generates a handbrake signal when a handbrake M3 of the vehicle V is not pulled up, and supplies the handbrake signal to the second microcomputer 24. When turned on, the light switch 44 lights on a light (a small light or a head light) M4 of the vehicle V and generates a light signal. The light signal is supplied to the second microcomputer 24.

The accessory device M1, the shift apparatus M2, the handbrake M3, and the light M4 correspond to vehicular devices mounted on the vehicle V (hereinafter, simply referred to as vehicular devices). For convenience of description, signals that are supplied to the second microcomputer 24 among the accessory signal, the shift position signal, the handbrake signal, and the light signal will be generally referred to as detection signals. When a detection signal is generated, the corresponding vehicular device is in operation.

When receiving the first receiving signal RS1 while the engine operation signal is supplied from the engine EG, the second microcomputer 24 generates a first warning signal WS1 and a first request signal that includes the first warning signal WS1 (hereinafter, referred to as a first warning request signal W1RQ1). The first warning request signal W1RQ1 is supplied to the first transmission circuit 21.

The first warning request signal W1RQ1 is supplied to the first microcomputer 14 via the antenna 35, the antenna 16 of the portable device 11, and the receiving circuit 13. That is, when the portable device 11 moves from the second area A2 to the first area A1 while the engine EG is in operation, the first warning request signal W1RQ1 is transmitted to the portable device 11 from the transmitter-receiver 12.

Upon receipt of the first receiving signal RS1 while receiving at least one of the detection signals, the second microcomputer 24 generates a second warning signal WS2 and a first request signal that includes the second warning signal WS2 (hereinafter, referred to as a second warning request signal W2RQ1). The second warning request signal W2RQ1 is supplied to the first transmission circuit 21.

The second microcomputer 24 generates the second warning signal WS2 that includes a specific signal code corresponding to each detection signal. The first microcomputer 14 identifies the second warning signal WS2 in accordance with the specific signal code.

The first microcomputer 14 is connected to a buzzer 50, a vibrator 51, an indicator light 52, and a display 53. The indicator light 52 is located on the surface of a case of the portable device 11 and is visible from the outside. The buzzer 50, the vibrator 51, the indicator light 52, and the display 53 are warning devices.

When receiving the first warning request signal W1RQ1, the first microcomputer 14 compares the first ID code with the second ID code. If the first and second ID codes coincide with each other, the first microcomputer 14 generates a first warning control signal WCS1 corresponding to the first warning signal WS1. The first warning control signal WCS1 is then supplied to the corresponding one of the buzzer 50, the vibrator 51, the indicator light 52, and the display 53.

When receiving the second warning request signal W2RQ1 and the first and second ID codes coincide with each other, the first microcomputer 14 generates a second warning control signal WCS2 corresponding to the specific code of the second warning signal WS2. The second warning control signal WCS2 is supplied to the buzzer 50, the vibrator 51, the indicator light 52, and the display 53.

The display 53 is, for example, a liquid crystal panel located on the surface of the portable device 11. The display 53 indicates, for example, characters "Engine In Operation" in accordance with the first warning control signal WCS1. The display 53 also indicates, for example, characters corresponding to the each detection signal such as "Accessory ON", "Shift Position", "Handbrake", and "Light ON" in accordance with the second warning control signal WCS2.

When the first warning control signal WCS1 and at least one second warning control signal WCS2, or when at least two second warning control signals WCS2 are supplied to the display 53, the display 53 alternately indicates the characters corresponding to each warning control signal.

When receiving at least one warning control signal among the first and second warning control signals WCS1, WCS2, for example, the buzzer 50 gives a warning whistle, the vibrator 51 generates vibration, and the indicator light 52 is lighted on.

That is, if the driver moves from the inside of the vehicle V to the outside of the vehicle V holding the portable device 11 when either (1) the engine EG is operating, (2) the accessory device M1 is operating, (3) the shift apparatus M2 is at a position other than the parking position, (4) the handbrake M3 is not pulled up, or (5) the light M4 is on, each warning device (50 to 53) gives a warning corresponding to the first warning signal WS1 and the second warning signal WS2.

The warning given by the buzzer 50, the vibrator 51, the indicator light 52, and the display 53 are cancelled in the following manner. When receiving the second request signal RQ2, and the first and second ID codes coincide with each other, the first microcomputer 14 stops supplying the warning control signals WCS1, WCS2 to the buzzer 50, the vibrator 51, the indicator light 52, and the display 53. That is, when the driver returns from the outside of the vehicle V to the inside of the vehicle holding the portable device 11, each warning is cancelled.

The vehicular remote control apparatus 10 according to the first embodiment provides the following advantages.

(1) When the driver moves to the outside of the vehicle V holding the portable device 11 while the engine EG is operating, the transmitter-receiver 12 automatically transmits the first warning request signal W1RQ1 to the portable device 11. The portable device 11 warns the driver using the buzzer 50, the vibrator 51, the indicator light 52, and the display 53 in accordance with the first warning request signal W1RQ1. Therefore, the driver becomes aware that the engine EG is operating at the outside of the vehicle V.

When the driver moves to the outside of the vehicle V holding the portable device 11 while at least one of the vehicular devices (M1 to M4) is operating, the transmitter-receiver 12 automatically transmits the second warning request signal W2RQ1 to the portable device 11. The portable device 11 warns the driver using the buzzer 50, the vibrator 51, the indicator light 52, and the display 53 in accordance with the second warning request signal W2RQ1. Therefore, the driver becomes aware that one or more of the vehicular devices (M1 to M4) is operating.

(2) The portable device 11 gives a warning using the buzzer 50, the vibrator 51, the indicator light 52, and the display 53 on condition that the first ID code coincides with the second ID code. Therefore, the driver accurately becomes aware whether the engine EG of the vehicle V corresponding to the portable device 11 is operating or the vehicular devices M1 to M4 of the vehicle V is operating.

Figure 2:
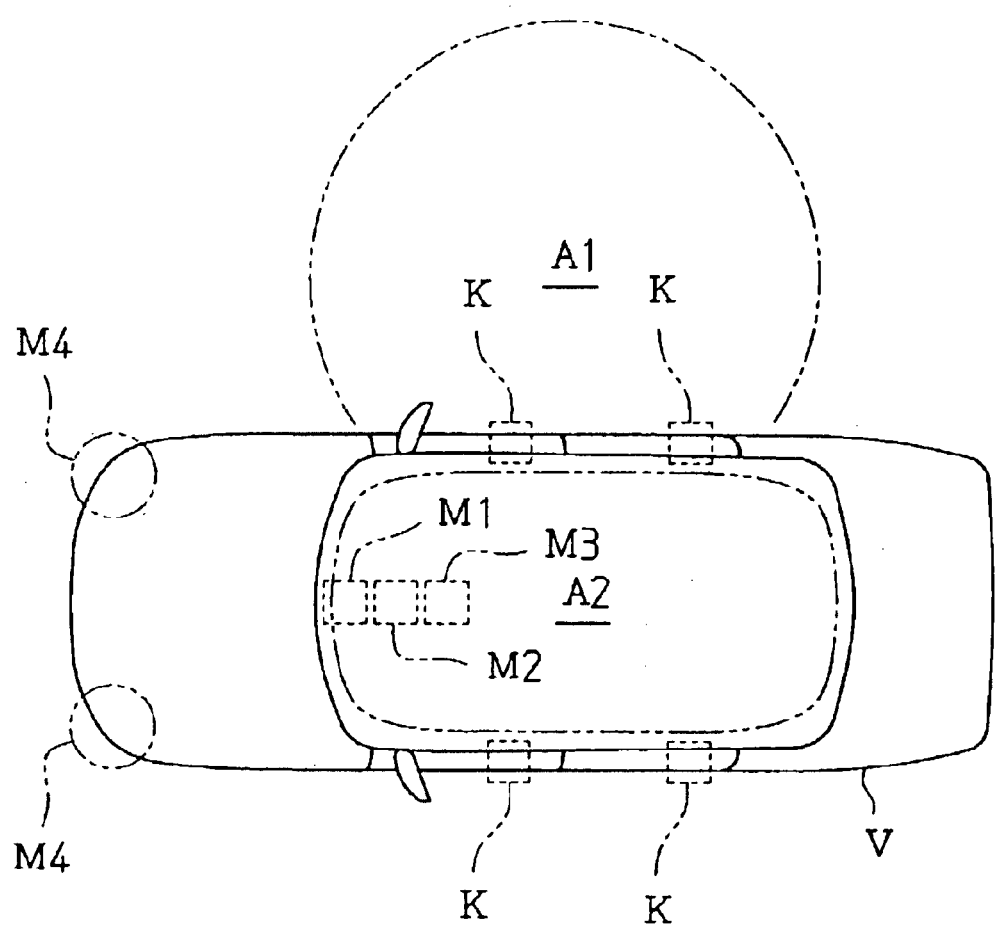
FIG. 2 is a schematic plan view illustrating an output area of first and second request signals according to the first and second embodiments.

A vehicular remote control apparatus 60 according to a second embodiment of the present invention will now be described with reference to FIGS. 1 and 2. In the vehicular remote control apparatus 60, part of the vehicular remote control apparatus 10 of the first embodiment is modified.

The vehicular remote control apparatus 60 automatically unlocks the door lock K by a mutual communication between the portable device 11 and the transmitter-receiver 12. The door lock K is locked by a wireless communication between the portable device 11 and the transmitter-receiver 12 in accordance with the operation of a locking switch (push button switch) 61 located on the portable device 11. That is, in the second embodiment, the door lock K is not automatically locked although the second microcomputer 24 does not receive the first and second receiving signals RS1, RS2 when the door lock K is unlocked.

As shown in FIG. 1, the portable device 11 includes the locking switch 61, which is connected to the first microcomputer 14. The locking switch 61 includes a push button switch (not shown) located on the surface of the portable device 11. When switched on, the push button switch generates an ON signal and supplies the ON signal to the first microcomputer 14. The first microcomputer 14 generates a lock transmission signal LPS, which includes lock command data, in accordance with the ON signal. The lock transmission signal LPS is transmitted via the transmission circuit 15 and the antenna 17. The lock transmission signal LPS includes the second ID code.

The transmitter-receiver 12 receives the lock transmission signal LPS sent from the portable device 11. The second microcomputer 24 is connected to a door switch 62. When the door lock is released, the door switch 62 generates a released signal (ON signal) and supplies the released signal to the second microcomputer 24. In the second embodiment, the vehicular device includes the door lock K.

Upon receipt of the lock transmission signal LPS via the receiving circuit 23 while receiving the released signal, the second microcomputer 24 generates a door lock control signal, which is then supplied to the door lock control apparatus 30. The door lock control apparatus 30 locks the door lock K in accordance with the door lock control signal. When the door lock K is locked, the door switch 62 stops generating the released signal.

Upon receipt of the first receiving signal RS1 while receiving the released signal, the second microcomputer 24 generates a third warning signal WS3, which is unlock data, and a first request signal that includes the unlock data (hereinafter, referred to as an unlock request signal ULRQ1). The unlock request signal ULRQ1 is supplied to the first transmission circuit 21 and then transmitted to the portable device 11.

When receiving the unlock request signal ULRQ1, the first microcomputer 14 compares the first and second ID codes. When the first and second ID codes coincide with each other, the first microcomputer 14 generates warning data, which is unlock information, and stores the unlock information in a storage device, which is a RAM 14a.

If the first microcomputer 14 no longer receives the first and second request signals RQ1, RQ2 while the unlock information is stored in the RAM 14a, the first microcomputer 14 generates a third warning control signal WCS3. The third warning control signal WCS3 is supplied to the buzzer 50, the vibrator 51, the indicator light 52, and the display 53. The display 53 indicates characters such as "Door Unlock" in accordance with the third warning control signal WCS3. Also, for example, the buzzer 50 gives a warning whistle, the vibrator 51 generates vibration, and the indicator light 52 is lighted on in accordance with the third warning control signal WCS3.

If the first microcomputer 14 receives the first request signal RQ1 that does not include the unlock data while the unlock information is stored in the RAM 14a, the first microcomputer 14 compares the first ID code and the second ID code. If the first and second ID codes coincide with each other, the first microcomputer 14 deletes the unlock information stored in the RAM 14a. That is, the first microcomputer 14 acknowledges that the door lock K of the vehicle V is locked by receiving the first request signal RQ1 that does not include the unlock data. Therefore, if the first microcomputer 14 no longer receives the first and second request signal after the unlock information is deleted, the first microcomputer 14 does not generate the third warning control signal WCS3.

When receiving the second request signal RQ2 while the unlock information is stored in the RAM 14a, the first microcomputer 14 compares the first ID code with the second ID code. If the first and second ID codes coincide with each other, the first microcomputer 14 deletes the unlock information stored in the RAM 14a. That is, the first microcomputer 14 recognizes that the portable device 11, or the driver, has moved from the outside of the vehicle V to the inside of the vehicle V by receiving the second request signal RQ2.

The vehicular remote control apparatus 60 according to the second embodiment provides the following advantages in addition to the advantages of the first embodiment.

(1) When the portable device 11 receives the unlock request signal ULRQ1 from the transmitter-receiver 12 at the outside of the vehicle V, the first microcomputer 14 of the portable device 11 stores the unlock data included in the unlock request signal ULRQ1 in the RAM 14a. If the first microcomputer 14 no longer receives the first and second request signals RQ1, RQ2 while the unlock information is stored in the RAM 14a, the first microcomputer 14 warns that the door is unlocked using the buzzer 50, the vibrator 51, the indicator light 52, and the display 53. Therefore, if the driver moves far apart from the vehicle V with the door lock K being unlocked, the driver becomes aware that the door lock K is unlocked by the operation of the portable device 11.

(2) The driver can lock the door lock K of the vehicle V corresponding to the portable device 11 at the first area A1 by manipulating the locking switch 61 located on the portable device 11.

It should be apparent to those skilled in the art that the present invention may be embodied in many other specific forms without departing from the spirit or scope of the invention. Particularly, it should be understood that the invention may be embodied in the following forms.

In the above embodiments, the first microcomputer 14 may be designed to supply the warning control signals WCS1 to WCS3 to at least one of the buzzer 50, the vibrator 51, the indicator light 52, and the display 53. More specifically, for example, a setting part S is connected to the first microcomputer 14 as shown in FIG. 1. The setting part S has a selector button (not shown), which is located on the surface of the portable device 11. By manually operating the setting part S via the selector button, the first microcomputer 14 can arbitrarily supply the warning control signals WCS1 to WCS3 to at least one of the buzzer 50, the vibrator 51, the indicator light 52, and the display 53.

In the first embodiment, the first microcomputer 14 may be designed to generate information corresponding to the warning control signals WCS1 to WCS3 (hereinafter, referred to as warning information) when the first ID code coincides with the second ID code and store the warning information in the RAM 14a. The warning information corresponds to the warning data. When the first microcomputer 14 no longer receives the first and second request signals (or when the portable device 11 is far apart from the first area A1) while the warning information is stored in the RAM 14a, the first microcomputer 14 may warn the driver via the buzzer 50, the vibrator 51, the indicator light 52, and the display 53.

In the above embodiments, a warning cancellation manipulating part may be located on the portable device 11 to cancel the warning of the buzzer 50, the vibrator 51, the indicator light 52, and the display 53 by manually manipulating the warning cancellation manipulating part.

In the first embodiment, at least one of the accessory switch 41, the shift position sensor 42, the handbrake switch 43, and the light switch 44 may be omitted.

In the second embodiment, at least one of the accessory switch 41, the shift position sensor 42, the handbrake switch 43, the light switch 44, and the door switch 62 may be omitted.

In the above embodiments, the warning signals WS1 to WS3 may be sent from the transmitter-receiver 12 separately from the first request signal. In this case, the first microcomputer 14 generates warning control signals WCS1 to WCS3 in accordance with the warning signals WS1 to WS3.

In the above embodiments, the buzzer 50 may be designed to play a melody upon receipt of a warning control signal.

In the above embodiments, the indicator light 52 may be designed to flash upon receipt of a warning control signal.

In the above embodiments, three of the buzzer 50, the vibrator 51, the indicator light 52, and the display 53 of the portable device 11 may be omitted at the maximum.

Warning procedures of the vehicular remote control apparatus 10 will now be described with reference to FIG. 3. FIG. 3 is a schematic flowchart illustrating one example of the warning procedures performed by the portable device 11 and the transmitter-receiver 12. Each warning procedure is performed when the vehicle V is stopped.

In step S10 of FIG. 3, the transmitter-receiver 12 generates the first and second request signals RQ1, RQ2. The transmitter-receiver 12 transmits the first request signal RQ1 to the outside of the vehicle V and transmits the second request signal RQ2 to the inside of the vehicle V. When receiving the first transmission signal PSI from the portable device 11, the transmitter-receiver 12 verifies the ID code (step S20). In step S20, if it is determined that the first ID code coincide with the second ID code, the transmitter-receiver 12 proceeds to step S30. In step S30, the transmitter-receiver 12 determines whether the engine is operating. If the first ID code coincides with the second ID code and the engine is operating, the transmitter-receiver 12 generates the first warning signal WS1, which is then transmitted to the outside of the vehicle V with the first request signal RQ1 (step S40).

When receiving the first warning signal WS1 at the outside of the vehicle, the portable device 11 verifies the ID code (step S50). When the first ID code coincides with the second ID code, the portable device 11 warns that the engine is operating (step S60).

In step S70, the transmitter-receiver 12 further judges whether the vehicular devices are operating. If any of the vehicular devices is operating, the transmitter-receiver 12 generates the second warning signal WS2 and transmits the second warning signal WS2 to the outside of the vehicle V with the request signal RQ1 (step S80).

When receiving the second warning signal WS2 at the outside of the vehicle V, the portable device 11 verifies the ID code (step S90). If the first ID code coincides with the second ID code, the portable device 11 warns the driver that one or more of the vehicular devices is operating (step S100). If the portable device 11 is subsequently brought into the vehicle V and the portable device 11 receives the second request signal RQ2 (step S110), the portable device 11 cancels the warning (step S120).

If it is determined that the engine is not operating in step S30, the transmitter-receiver 12 proceeds to step S70. The transmitter-receiver 12 and the portable device 11 then execute only the process for warning of the vehicular devices.

Therefore, the present examples and embodiments are to be considered as illustrative and not restrictive and the invention is not to be limited to the details given herein, but may be modified within the scope and equivalence of the appended claims.

What is claimed is:

1. A remote control apparatus of a vehicle having an engine, the remote control apparatus comprising:
   a transmitter-receiver located inside the vehicle, wherein the transmitter-receiver generates a first request signal, which includes a first ID code; and
   a portable device, wherein the portable device generates a transmission signal in response to the first request signal and transmits the transmission signal to the transmitter-receiver,
   wherein the first request signal is transmitted to outside the vehicle, and
   wherein the transmitter-receiver includes:
      a determining device for determining whether the engine is operating; and
      a warning signal transmission device, wherein, when it is determined, by the determining device, that the engine is operating when receiving the transmission signal, the warning signal transmission device generates a first warning signal and transmits the first warning signal to outside the vehicle, and
   wherein the portable device includes a warning device, and wherein, when the portable device receives the first warning signal, the warning device gives a warning.

2. The vehicular remote control apparatus according to claim 1,
   wherein the transmission signal generated by the portable device includes a second ID code, which corresponds to the first ID code, and
   wherein the warning signal transmission device determines whether the first ID code coincides with the second ID code and generates the first warning signal if the first ID code coincides with the second ID code.

3. The vehicular remote control apparatus according to claim 1,
   wherein the portable device has a second ID code, which corresponds to the first ID code, and determines whether the first ID code coincides with the second ID code, and
   wherein, when the portable device receives the first warning signal and the first ID code coincides with the second ID code, the warning device gives a warning.

4. The vehicular remote control apparatus according to claim 1,
   wherein the transmitter-receiver transmits the first request signal to a predetermined area outside the vehicle.

5. The vehicular remote control apparatus according to claim 1,
   wherein the transmitter-receiver transmits the first warning signal with the first request signal.

6. The vehicular remote control apparatus according to claim 1,
   wherein the transmitter-receiver generates a second request signal for inside the vehicle, wherein the second request signal includes the first ID code, and
   wherein, when receiving the second request signal while the warning device is giving a warning, the portable device cancels the warning of the warning device.

7. The vehicular remote control apparatus according to claim 1,
   wherein the vehicle includes a vehicular device, which is involved in the operation of the vehicle,
   wherein the determining device determines whether the vehicular device is operating,
   wherein, when receiving the transmission signal it is determined, by the determining device, that the vehicular device is operating, the warning signal transmission device generates a second warning signal and transmits the second warning signal to outside the vehicle, and
   wherein, when receiving the second warning signal, the portable device gives a warning using the warning device.

8. The vehicular remote control apparatus according to claim 7,
   wherein the portable device has a second ID code, which corresponds to the first ID code, and
   wherein the warning signal transmission device determines whether the first ID code coincides with the second ID code and generates the first and second warning signals if the first ID code coincides with the second ID code.

9. The vehicular remote control apparatus according to claim 7,
   wherein the portable device has a second ID code, which corresponds to the first ID code, and wherein the portable device determines whether the first ID code coincides with the second ID code, and
   wherein, when the portable device receives the second warning signal and the first ID code coincides with the second ID code, the warning device gives a warning regarding the second warning signal.

10. The vehicular remote control apparatus according to claim 7,
    wherein the transmitter-receiver transmits the second warning signal with the first request signal.

11. The vehicular remote control apparatus according to claim 7,
    wherein the transmitter-receiver generates a second request signal for inside the vehicle, wherein the second request signal includes the first ID code, and
    wherein, when receiving the second request signal while the warning device is giving a warning, the portable device cancels the warning of the warning device.

12. The vehicular remote control apparatus according to claim 11,
    wherein the portable device includes:
    a storage device, wherein, when the portable device receives the first warning signal or the second warning signal, the storage device stores warning information relating to the first warning signal or the second warning signal; and
    a warning control device connected to the storage device, wherein, when neither the first request signal nor the second request signal are being received, the warning control device gives a warning using the warning device in accordance with the warning information stored in the storage device.

13. The vehicular remote control apparatus according to claim 7,
    wherein the vehicular device includes a door lock,
    wherein the transmitter-receiver generates a second request signal for inside the vehicle, wherein the second request signal includes the first ID code,
    wherein the determining device determines whether the door lock is unlocked,
    wherein, when it is determined, by the determining device, that the door lock is unlocked when receiving the transmission signal, the warning signal transmission device generates a third warning signal relating to the unlock and transmits the third warning signal to outside the vehicle, and wherein the portable device includes:

a storage device, wherein, when the portable device receives the third warning signal, the storage device stores warning information relating to the unlock; and a warning control device connected to the storage device, wherein, when neither the first request signal nor the second request signal are being received, the warning control device gives a warning using the warning device in accordance with the warning information stored in the storage device.

14. The vehicular remote control apparatus according to claim 13, wherein the transmitter-receiver transmits the third warning signal with the first request signal.

15. A remote control apparatus of a vehicle having an engine, the remote control apparatus comprising:

a transmitter-receiver located inside the vehicle, wherein the transmitter-receiver generates a request signal, which includes a first ID code; and a portable device, wherein the portable device generates a transmission signal, which includes a second ID code corresponding to the first ID code, in response to the request signal and transmits the transmission signal to the transmitter-receiver, wherein the request signal is transmitted to outside the vehicle when the vehicle is stopped, and wherein the transmitter-receiver includes:

a first control device, wherein the first control device determines whether the engine is operating and receives the transmission signal, wherein the first control device determines whether the first ID code coincides with the second ID code, and wherein, when it is determined that the engine is operating and the first ID code coincides with the second ID code, the first control device generates a first warning signal; and a transmission circuit connected to the first control device, wherein the transmission circuit transmits the first warning signal with the first ID code to outside the vehicle, and wherein the portable device includes:

a second control device, wherein the second control device receives the first warning signal and determines whether the first ID code coincides with the second ID code, and wherein, when the first ID code coincides with the second ID code, the second control device generates a first warning control signal; and a warning device connected to the second control device, wherein the warning device gives a warning indicating that the engine is operating in accordance with the first warning control signal.

16. The vehicular remote control apparatus according to claim 15, wherein the vehicle includes a vehicular device connected to the first control device, wherein the first control device determines whether the vehicular device is operating, and wherein, when it is determined that the vehicular device is operating and the first ID code coincides with the second ID code, the first control device generates a second warning signal, wherein the transmission circuit transmits the second warning signal to outside the vehicle with the first ID code, wherein, when receiving the second warning signal, the second control device determines whether the first ID code coincides with the second ID code, and when it is determined that the first ID code coincides with the second ID code, the second control device generates a second warning control signal, and wherein the warning device gives a warning indicating that the vehicular device is operating in accordance with the second warning control signal.

17. A method relating to a vehicle having an engine for giving a warning by means of a transmitter-receiver located inside the vehicle and a portable device that communicates with the transmitter-receiver, the method comprising:

generating a first request signal including a first ID code and transmitting the first request signal to outside the vehicle by means of the transmitter-receiver when the vehicle is stopped, generating a transmission signal, which includes a second ID code corresponding to the first ID code, in response to the first request signal and transmitting the transmission signal to the transmitter-receiver;

generating a first warning signal if the engine is operating when the transmitter-receiver receives the transmission signal;

transmitting the first warning signal to outside the vehicle; and giving a first warning by means of the portable device in accordance with the first warning signal when the portable device receives the first warning signal, wherein the first warning indicates that the engine is operating.

18. The method according to claim 17, wherein transmitting the first warning signal to outside the vehicle includes transmitting the first warning signal with the first request signal.

19. The method according to claim 18, further comprising:

determining whether the first ID code coincides with the second ID code when the transmitter-receiver receives the transmission signal; and determining whether the first ID code coincides with the second ID code when the portable device receives the first warning signal, wherein generating the first warning signal includes generating the first warning signal when the first ID code coincides with the second ID code, and wherein giving a first warning includes giving the first warning when the first ID code coincides with the second ID code.

20. The method according to claim 17, wherein the vehicle includes a vehicular device connected to the transmitter-receiver, the method further comprising:

determining whether the vehicular device is operating;

generating a second warning signal if it is determined that the vehicular device is operating when the transmitter receiver receives the transmission signal;

transmitting the second warning signal to outside the vehicle; and giving a second warning by means of the portable device in accordance with the second warning signal when the portable device receives the second warning signal, wherein the second warning indicates that the vehicular device is operating.

21. The method according to claim 20,
wherein transmitting the second warning signal to outside of the vehicle includes transmitting the second warning signal with the first request signal.

22. The method according to claim 21, further comprising:
- determining whether the first ID code coincides with the second ID code when the transmitter-receiver receives the transmission signal; and
- determining whether the first ID code coincides with the second ID code when the portable device receives the second warning signal,
- wherein generating the second warning signal includes generating the second warning signal when the first ID code coincides with the second ID code; and
- wherein giving a second warning includes giving the second warning when the first ID code coincides with the second ID code.

23. The method according to claim 20, further comprising:
- generating a second request signal for inside the vehicle, wherein the second request signal includes the first ID code, and transmitting the second request signal by the transmitter-receiver when the vehicle is stopped; and
- canceling the first warning end the second warning when the portable device receives the second request signal.

* * * * *

UNITED STATES PATENT AND TRADEMARK OFFICE
CERTIFICATE OF CORRECTION

PATENT NO. : 6,924,734 B2
DATED : August 2, 2005
INVENTOR(S) : Chikao Nagasaka et al.

It is certified that error appears in the above-identified patent and that said Letters Patent is hereby corrected as shown below:

Column 4,
Line 53, delete "ROMN", and insert therefor -- ROM. --.

Column 10,
Line 24, delete "PSI", and insert therefor -- PS1 --.

Column 16,
Line 11, delete "end", and insert therefor -- and --.

Signed and Sealed this

Eighth Day of November, 2005

JON W. DUDAS
*Director of the United States Patent and Trademark Office*